United States Patent
Blum et al.

(10) Patent No.: US 6,706,801 B1
(45) Date of Patent: Mar. 16, 2004

(54) AQUEOUS REACTIVE PUTTY (I)

(75) Inventors: Harald Blum, Leverkusen (DE); Horst Clemens, Krefeld (DE); Michael Ehlers, Krefeld (DE); Joachim Probst, Leverkusen (DE); Joachim Wolff, Odenthal (DE); Christoph Irle, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/868,404

(22) PCT Filed: Dec. 8, 1999

(86) PCT No.: PCT/EP99/09635

§ 371 (c)(1),
(2), (4) Date: Jun. 14, 2001

(87) PCT Pub. No.: WO00/37523

PCT Pub. Date: Jun. 29, 2000

(30) Foreign Application Priority Data

Dec. 21, 1998 (DE) .......................... 198 58 818
Dec. 21, 1998 (DE) .......................... 198 58 817

(51) Int. Cl.$^7$ .............................. C08L 75/12
(52) U.S. Cl. ................ 524/507; 523/201; 524/591; 428/424.2; 428/424.4; 428/424.8
(58) Field of Search ................ 524/507, 591; 523/201; 428/424.2, 424.8, 424.4

(56) References Cited

U.S. PATENT DOCUMENTS

| 4,177,183 | A | * | 12/1979 | Dalibor | 428/423.1 |
|---|---|---|---|---|---|
| 4,948,443 | A | | 8/1990 | Speer | 156/94 |
| 5,075,370 | A | * | 12/1991 | Kubitza et al. | 524/591 |
| 5,367,004 | A | * | 11/1994 | Barsotti et al. | 523/414 |
| 5,665,434 | A | * | 9/1997 | Mass et al. | 427/393.5 |
| 5,744,542 | A | * | 4/1998 | Martz et al. | 524/507 |
| 5,852,111 | A | * | 12/1998 | Watanabe et al. | 524/196 |

FOREIGN PATENT DOCUMENTS

| DE | 19 733 166 | | 4/1999 |
|---|---|---|---|
| EP | 0 103 253 | | 3/1984 |
| EP | 0 358 979 | | 3/1990 |
| EP | 0 835 889 | | 4/1998 |
| JP | 61243868 | * | 10/1986 |

OTHER PUBLICATIONS

Database WPI, Section Ch, Week 198650, Derwent Publications Lts., London, GB; Class A14, AN 1986–328440, XP002133724, & JP 61 243868 A (Dainippon Ink & Chem KK) Oct. 30, 1986, abstract.

Database WPI, Section Ch, Week 199504, Derwent Publications Ltd., London, GB; Class A25, AN 1995–027766, XP002133821 & JP 06 313106 A (Mitsui Toatsu Chem Inc), Nov. 8, 1994, abstract.

* cited by examiner

Primary Examiner—Judy M. Reddick
(74) Attorney, Agent, or Firm—Joseph C. Gil; Gary Matz

(57) ABSTRACT

The invention relates to aqueous reactive 2-component binder combinations for aqueous reactive filler compositions, processes for the preparation of aqueous reactive filler compositions based on aqueous reactive 2-component binder combinations and the use of such filler compositions.

21 Claims, No Drawings

AQUEOUS REACTIVE PUTTY (I)

BACKGROUND OF THE INVENTION

The invention relates to aqueous reactive 2-component binder combinations for aqueous reactive filler compositions, processes for the preparation of aqueous reactive filler compositions based on aqueous reactive 2-component binder combinations and the use of such filler compositions.

Unsaturated polyester resins as binders for filler compositions have been known for a long time. However, such products comprise relatively large amounts of reactive, volatile solvents, preferably styrene, as copolymerizable monomers. There has been no lack of attempts to develop binders based on unsaturated polyesters which have such a low viscosity that they can accommodate the large amounts of filler substances characteristic of filler compositions and, in spite of low molecular weights, can be hardened with the aid of peroxides in the absence of copolymerizable monomers to give non-tacky filler compositions. An example which may be mentioned here is EP-A 154 924, in which polyesters based on unsaturated dicarboxylic acids, diols and allyl ethers which can be formulated to filler compositions without reactive volatile solvents are claimed. On account of the reactivity being too low or the curing being too slow for a number of applications, and because of the expensive preparation of the raw materials (high raw materials cost), these and similar systems have so far not been able to find acceptance in the market. Aqueous one-component filler compositions are likewise known, but such products do not have the required level of properties for many areas of application.

There is therefore still the object of providing raw materials or binder combinations for filler compositions which can be formulated in a stable manner without the use of reactive, volatile solvents and using the high to very high amounts of filler substances characteristic of filler compositions, and can be cured in times relevant in practice to give high-quality filler compositions which can also be used in very thick layers up into the centimeter range. Other important requirements of new binder combinations for filler compositions are a rapid sandability, a specific filling consistency which is absolutely essential for proper processing, a high hardness with simultaneously adequate flexibility, a high filling power, a good adhesion to various substrates, a very good overpaintability with various paint systems, and good resistance properties.

Other important requirements of modern filler compositions are a lowest possible content of volatile organic substances (environment-friendliness), and a high variability (broad applicability), i.e. the possibility of being able to formulate, on the basis of suitable binder combinations by choice of corresponding raw materials, additives, filler substances and pigments, both very highly reactive filler compositions, with then a relatively short processing time, and also filler compositions with a longer processing time and nevertheless a good reactivity.

SUMMARY OF THE INVENTION

Surprisingly, it has now been found that aqueous reactive 2-component binder combinations for aqueous reactive filler compositions comprising
a) at least one copolymer present in an aqueous dispersion or emulsion and
b) at least one polyisocyanate containing free isocyanate groups, arcapable of meeting the abovementioned requirements.

The binder combinations according to the invention and the filler compositions prepared therefrom comprise only small amounts of volatile organic constituents and have a wide variability in respect of the reactivity By suitable choice of the raw materials, it is furthermore possible to prepare light-fast filler compositions which show practically no yellowing or chalking or discoloration in the conventional areas of application of filler compositions.

DETAILED DESCRIPTION OF THE INVENTION

The invention also provides aqueous reactive 2-component binder combinations for aqueous reactive filler compositions comprising
a) at least one copolymer, present in an aqueous dispersion and/or emulsion, comprising
   a1) 35 to 95 wt. % of hardening monomers,
   a2) 0 to 50 wt. % of plasticizing monomers,
   a3) 0 to 50 wt. % of hydroxy-functional monomers,
   a4) 0 to 6 wt. % of acid-functional monomers, which can optionally be present in part or completely in the neutralized form,
   a5) 0 to 25 wt. % of other monomers and
b) at least one polyisocyanate which contains free isocyanate groups and has a viscosity of 10 to 20,000 mPas/23° C. and a functionality of 1.5 to 7.5,
the sum of the % figures of a1) to a5) being 100.

The invention preferably provides aqueous reactive 2-component binder combinations for aqueous reactive filler compositions according to claim 1 comprising
a) at least one aqueous emulsion copolymer with a molecular weight of >50,000 g/mol, comprising
   a1) 40 to 90 wt. % of hardening monomers,
   a2) 0 to 50 wt. % of plasticizing monomers,
   a3) 0 to 40 wt. % of hydroxy-functional monomers,
   a4) 0.5 to 5 wt. % of acid-functional monomers, which can optionally be present in part or completely in the neutralized form,
   a5) 0 to 15 wt. % of other monomers and
b) at least one polyisocyanate which contains free isocyanate groups and has a viscosity of 10 to 20,000 mPas/23° C. and a functionality of 2 to 6,
the sum of the % figures of a1) to a5) being 100.

The invention particularly preferably provides aqueous reactive 2-component binder combinations for aqueous reactive filler compositions comprising
a) at least one emulsion copolymer which contains isocyanate-reactive groups and has a molecular weight of >50,000 g/mol, comprising
   a1) 50 to 85 wt. % of hardening monomers,
   a2) 5 to 30 wt. % of plasticizing monomers,
   a3) 2 to 30 wt. % of hydroxy-functional monomers,
   a4) 1 to 4 wt. % of carboxyl- and/or carboxylate-functional monomers and
b) at least one polyisocyanate which contains free isocyanate groups and has a viscosity of 10 to 10,000 mPas/23° C. and a functionality of 2.4 to 5.5,
the sum of the % figures of a1) to a4) being 100.

The aqueous reactive filler compositions according to the invention comprise
a) at least one copolymer present in an aqueous dispersion or emulsion,
b) at least one polyisocyanate which contains free isocyanate groups and has a viscosity of 10 to 20,000 mPas/23° C. and a functionality of 1.5 to 7.5, c) at least one pigment and/or filler, d) optionally auxiliary substances and additives, e) optionally further oligomers or polymers present in the form of an aqueous solution, dispersion or emulsion and f) optionally water and/or an organic solvent, the weight ratio of resin (solid from component a), from component b) and optionally from component e)) to pigment/filler (solid from component c)) being 1:1.3 to 1:20.

The invention also provides aqueous reactive filler compositions comprising a) 10 to 50 wt. % of at least one emulsion copolymer, b) 1 to 15 wt. % of at least one polyisocyanate which contains free isocyanate groups and has a viscosity of 10 to 20,000 mPas/23° C. and a functionality of 2 to 6, c) 40 to 90 wt. % of at least one pigment and/or filler, d) 0 to 3 wt. % of auxiliary substances, additional substances and/or additives, e) 0 to 50 wt. % of further oligomers or polymers optionally present in the form of an aqueous solution, dispersion or emulsion and f) 0 to 20 wt. % of water and/or organic solvents, the sum of a) to f) being 100 wt. % and the weight ratio of resin (solid from component a), from component b) and optionally from component e)) to pigment/filler (solid from component c)) being 1:1.5 to 1:15.

The invention also preferably provides aqueous reactive filler compositions comprising a) 10 to 50 wt. % of at least one polymerized-in emulsion copolymer, comprising a1) 35 to 95 wt. % of hardening monomers, a2) 0 to 50 wt. % of plasticizing monomers, a3) 0 to 50 wt. % of hydroxy-functional monomers, a4) 0 to 6 wt. % of acid-functional monomers, which can optionally be present in part or completely in the neutralized form, a5) 0 to 25 wt. % of other monomers and b) 1 to 9.8 wt. % of at least one polyisocyanate which contains free isocyanate groups and has a viscosity of 10 to 20,000 mPas/23° C. and a functionality of 2 to 6, c) 40 to 90 wt. % of at least one pigment and/or filler, d) 0 to 3 wt. % of auxiliary substances, additional substances and/or additives, e) 0 to 50 wt. % of further oligomers or polymers optionally present in the form of an aqueous solution, dispersion or emulsion and f) 0 to 20 wt. % of water and/or organic solvents, the sum of a) to f) being 100 wt. % and the weight ratio of resin (solid from component a), from component b) and optionally from component e)) to pigment/filler (solid from component c)) being 1:1.5 to 1:15.

The invention also particularly preferably provides aqueous reactive filler compositions comprising a) 10 to 50 wt. % of at least one polymerized-in emulsion copolymer of molecular weight >25,000 g/mol, comprising a1) 40 to 90 wt. % of hardening monomers, a2) 0 to 35 wt. % of plasticizing monomers, a3) 0 to 29.5 wt. % of hydroxy-functional monomers, a4) 0.5 to 5 wt. % of carboxyl- and/or carboxylate-functional monomers, a5) 0 to 15 wt. % of other monomers and 1 to 9.8 wt. % of at least one polyisocyanate which contains free isocyanate groups and has a viscosity of 10 to 20,000 mPas/23° C. and a functionality of 2 to 6, b) 40 to 90 wt. % of at least one pigment and/or filler, c) 0 to 3 wt. % of auxiliary substances, additional substances and/or additives, d) 0 to 50 wt. % of further oligomers or polymers optionally present in the form of an aqueous solution, dispersion or emulsion and e) 0 to 20 wt. % of water and/or organic solvents, the sum of a) to f) being 100 wt. % and the weight ratio of resin (solid from component a), from component b) and optionally from component e)) to pigment/filler (solid from component c)) being 1:1.5 to 1:15.

The invention also especially preferably provides aqueous reactive filler compositions comprising a) 10 to 50 wt. % of at least one polymerized-in emulsion copolymer which contains isocyanate-reactive groups and has a molecular weight of >50,000 g/mol, comprising a1) 50 to 85 wt. % of hardening monomers, a2) 5 to 30 wt. % of plasticizing monomers, a3) 2 to 30 wt. % of hydroxy-functional monomers, a4) 1 to 4 wt. % of carboxyl- and/or carboxylate-functional monomers and b) 1 to 9.8 wt. % of at least one polyisocyanate which contains free isocyanate groups and has a viscosity of 10 to 20,000 mPas/23° C. and a functionality of 2.4 to 5.5, c) 40 to 90 wt. % of at least one pigment and/or filler, d) 0 to 3 wt. % of auxiliary substances, additional substances and/or additives, e) 0 to 50 wt. % of further oligomers or polymers optionally present in the form of an aqueous solution, dispersion or emulsion and f) 0 to 20 wt. % of water and/or organic solvents, the sum of a) to f) being 100 wt. % and the weight ratio of resin (solid from component a), from component b) and optionally from component e)) to pigment/filler (solid from component c)) being 1:1.5 to 1:15.

The invention furthermore especially preferably provides aqueous filler compositions comprising a) 22 to 38 wt. % of at least one emulsion copolymer which contains isocyanate-reactive groups and has a molecular weight of >50,000 g/mol, b) 1 to 7.5 wt. % of at least one polyisocyanate which contains free isocyanate groups and has a viscosity of 10 to 10,000 mPas/23° C. and a functionality of 2.4 to 5.5.

c) 53 to 75 wt. % of at least one pigment and/or filler, d) 0 to 2 wt. % of auxiliary substances, additional substances and/or additives, e) 0 to 20 wt. % of further oligomers or polymers optionally present in the form of an aqueous solution, dispersion or emulsion and f) 0 to 10 wt. % of water and/or organic solvents, the sum of a) to f) being 100 wt. % and the weight ratio of resin (solid from component a), from component b) and optionally from component e)) to pigment/filler (solid from component c)) being 1:2.1 to 1:10.

The invention also provides a process for the preparation of reactive filler compositions, characterized in that a component which makes up at least 85 wt. % of the filler composition according to the invention is first prepared with the consistency required for processing appropriate in practice from at least one polymer a) present as a dispersion or emulsion with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 20 wt. %, based on the total solids content, of an organic solvent and/or water f) in a suitable technical apparatus, and this is then mixed homogeneously, directly before use, with the second component, which makes up not more than 15 wt. % of the filler composition according to the invention, that is to say at least one polyisocyanate crosslinking agent b), to give the filler composition according to the invention.

The invention also provides a process for the preparation of reactive filler compositions, characterized in that a component which makes up 90.2 to 99 wt. % of the filler composition according to the invention is first prepared with the consistency required for processing appropriate in practice from at least one emulsion copolymer a) containing isocyanate-reactive groups with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 20 wt. %, based on the total solids content, of an organic solvent and/or water f) in a suitable technical apparatus, and this is then mixed homogeneously, directly before use, with the second component, which makes up 9.8 to 1 wt. % of the filler composition according to the invention, that is to say at least one polyisocyanate crosslinking agent b), to give the filler composition according to the invention.

The invention also provides a process for the preparation of reactive filler compositions, characterized in that the filler composition according to the invention is first prepared, directly before processing of the filler composition, from at least one copolymer a) present as a dispersion or emulsion with pigment or pigment mixtures, filler substances or filler substance mixtures c), optionally additives, auxiliary substances and additional substances d), optionally further oligomers or polymers e) optionally present in the form of an aqueous solution, dispersion or emulsion, optionally up to 10 wt. %, based on the total solids content, of an organic solvent and/or water f) and at least one polyisocyanate crosslinking agent b) in a suitable technical apparatus and this is then optionally adjusted to the required processing consistency by addition of water and/or an organic solvent.

The invention also provides the use of the reactive 2-component binder combinations according to the invention in or as aqueous reactive filler compositions.

The invention also provides the use of the reactive 2-component binder combinations according to the invention in or as aqueous reactive filler compositions for wood, woody substrates and/or cork.

The invention also provides the use of the reactive 2-component binder combinations according to the invention in or as aqueous reactive filler compositions for metallic substrates, vehicle bodies and/or plastics.

The invention also provides the use of the reactive 2-component binder combinations according to the invention in or as aqueous reactive filler compositions for marble, granite and mineral substrates.

Suitable polymers a) present in a dispersion or emulsion can be e.g. polyacrylate dispersions or emulsions, polyacrylate dispersions or emulsions containing vinylaromatics, vinyl ester, vinyl ether or vinyl chloride dispersions or emulsions, polyacrylate-polyester dispersions or emulsions, polyacrylate-polyurethane dispersions or emulsions, styrene-containing emulsions or dispersions, polymer-polyepoxide dispersions, dispersions based on optionally hydrophilized polyolefins, polymer-polyamide dispersions, polymer-amino resin dispersions, dispersions or emulsions containing cellulose or cellulose derivatives, fluorine-containing aqueous dispersions or emulsions, dispersions or emulsions containing alkoxysilane or silicone groups, and mixtures of the dispersions mentioned and also other dispersions.

Suitable isocyanate-reactive groups can be e.g. hydroxyl, amino, thio, epoxy, ketimine, aldimine, anhydride, oxazolidine, amide or lactam groups, aspartic acid ester groups containing secondary amine functions, and phenol and carboxyl or carboxylate groups.

Polymers a) preferably contain hydroxyl groups and/or carboxyl groups as isocyanate-reactive groups, it being possible for the groups mentioned last also to be partly or completely in the neutralized form. Polymers without hydroxyl groups can also be employed.

Preferred polymers a) are polyacrylate dispersions, polyacrylate emulsions, styrene-containing polyacrylate dispersions or emulsions, polyacrylate-polyurethane dispersions or emulsions, vinyl ether or vinyl ester emulsions and polyacrylate-polyester dispersions or emulsions.

Copolymers a) prepared by the emulsion copolymerization process which contain at least 75, preferably 100 wt. % polymerized-in acrylic acid esters and/or methacrylic acid esters and/or vinylaromatics are especially preferred. Other copolymerizable monomers, oligomers or polymers, which can be present in amounts of up to 25 wt. %, are e.g. maleic acid mono- and bisesters, vinyl esters, vinyl ethers, allyl ethers, allyl esters, olefins, diolefins and polyolefins. The monomers and oligomers and polymers mentioned here are not intended to exclude the co-use of other copolymerizable monomers, oligomers or polymers which are not mentioned.

Monomers or oligomers or polymers with more than one copolymerizable double bond can also be co-used in the preparation of emulsion copolymers a).

Polymer resins a) are prepared by the methods known per se of free-radical polymerization, e.g. solution polymerization, emulsion polymerization and suspension polymerization. The process of free-radical emulsion polymerization in an aqueous medium is preferred. Continuous and discontinuous polymerization processes are possible. Of the possible discontinuous processes, feed processes are particularly preferred. In these, water, optionally together with portions or the total amount of emulsifier or surface-active substance and optionally with portions of the monomers and/or of polymers and optionally with portions of the initiator or of the initiator mixture, is initially introduced into the reaction vessel and heated to the reaction temperature. The monomers or the remainder of the monomers and the initiator or the initiator mixture or portions of the initiator or of the initiator mixture, optionally together with portions of the emulsifier or of the surface-active substance, are then metered in. If necessary, when the addition of the monomers has ended, a small amount of initiator can subsequently be added again, in order to achieve with certainty the desired, very high monomer conversion in the after-reaction phase.

The emulsion polymerization can be carried out by a one-stage or by a multi-stage polymerization process, wherein, in the multi-stage process, identical or different monomer mixtures in identical or different amounts and identical or different initiators and/or emulsifiers or initiator and/or emulsifier concentrations can be employed in each stage. With a multi-stage polymerization process it is possible to prepare e.g. core-shell morphologies, e.g. with a hard core and soft shell or vice versa or different contents of isocyanate-reactive groups in the core and shell. In the multi-stage procedure with core-shell morphology, the content of the core is 20 to 80, preferably 35 to 65 wt. %, based on the total solids content of the emulsion.

By this procedure it is possible, surprisingly, for a specific level of properties to be established for the applications in the aqueous reactive filler compositions according to the invention. In particular, it is possible to obtain filler compositions which have a particularly rapid sandability and an improved drying, in particular an improved surface-drying (drying properties directly after application).

In a preferred embodiment of the aqueous reactive filler compositions according to the invention, these therefore comprise emulsion copolymers with a core-shell structure prepared by a two-stage process, wherein the content of the core is 20 to 80, preferably 35 to 65 wt. %, and the core and shell comprise different percentage contents of isocyanate-reactive monomers and/or plasticizing monomers, and these differences are at least 100 wt. %, it also being possible for monomers to be contained exclusively in the core or exclusively in the shell in a polymerized-in form.

A build-up such that the polymer content of the core has a lower glass transition temperature than the polymer content of the shell, and the amount of isocyanate-reactive groups in the shell is at least twice that in the core is particularly preferred.

The emulsion polymers can also be prepared from other polymer dispersions, such as e.g. polyurethane dispersions, in the presence of polymeric emulsifiers. In this case, for example, an amount of 0 to 50%, based on the total solids content of the end product, of a polyurethane dispersion can be initially introduced into the reaction vessel, optionally together with emulsifiers, and an emulsion polymerization can be carried out in the presence thereof, as described above. The emulsion polymerization can also be carried out in the presence of other polymers present as a dispersion or solution in water, instead of in the presence of a polyurethane dispersion, such as e.g. polyacrylate secondary dispersions, polyacrylate emulsion polymers, dispersions containing vinylaromatics, vinyl esters, olefins or vinyl ethers, polyurethane-polyurea dispersions or polyester dispersions or solutions.

Suitable initiators can be water-soluble or water-insoluble substances or substance mixtures which form free radicals, these being employed in amounts of 0.025 to 3, preferably 0.1 to 0.75, particularly preferably 0.15 to 0.45 wt. %, based on the amount of monomer employed. Suitable initiators are e.g. hydrogen peroxide, benzoyl peroxide, cumene hydroperoxide, dibenzyl peroxydicarbonate, di-tert-butyl peroxide, tert-butyl hydroperoxide, tert-butyl peroctoate, ammonium peroxodisulfate, sodium peroxodisulfate, potassium peroxodisulfate, azoisobutyric acid dinitrile, dibenzoyl peroxide, tert-butyl perpivalate and tert-butyl perbenzoate. In the case of redox systems, reducing agents, such as e.g. isoascorbic acid, ascorbic acid, sodium bisulfite, salts of hydroxymethanesulfinic acid and formamidine-sulfinic acid (Rongalit C), optionally also in combination with iron(II) sulfate and EDTA (Trilon B), are additionally employed. With these, polymerization reactions can also be carried out at lower temperatures.

The polymerization is usually carried out at temperatures from 30 to 95° C., preferably at 45 to 85° C.

Conventional regulators can be employed to regulate the molecular weight of the polymers, such as e.g. n- or tert-dodecylmercaptan. However, the co-use of such substances is not preferred. Polymers a) which are preferably employed contain no such substances.

The particle size can be influenced e.g. by the amount of emulsifier, emulsifier mixtures or surface-active substances employed. Emulsifiers are employed in amounts of 0.25 to 7.0, preferably 0.5 to 3.0, especially preferably 1.0 to 2.0 wt. %. The average particle size of the emulsion is between 10 and 600, preferably between 30 and 180 nanometers, it also being possible for the emulsion to comprise particles of different sizes.

The emulsifiers or surface-active substances employed preferably comprise anionic and/or nonionic structural units. Anionic emulsifiers can be low molecular weight defined substances, and also oligomeric or polymeric substances or substance mixtures, which contain e.g. sulfonate, sulfate, carboxylate, phosphate or phosphonate groups as anionic groups. Emulsifiers which are particularly suitable are e.g. those which consist of long-chain alkyl or aryl radicals and a hydrophilic polyether chain based on ethylene oxide or ethylene oxide/propylene oxide and bonded to a hydroxyl groups, and additionally contain a sulfonate, sulfate, phosphonate or phosphate group. Ammonia, amines or sodium or potassium are suitable for converting the acid groups into salt groups. Suitable nonionic emulsifiers, which are preferably employed in combination with ionic emulsifiers, are e.g. ethoxylated or ethoxylated/propoxylated fatty acids, ethoxylated or ethoxylated/propoxylated alkylphenols, ethoxylated or ethoxylated/propoxylated long-chain alcohols, such as e.g. stearyl alcohol, oleyl alcohol or lauryl alcohol, ethoxylated or ethoxylated/propoxylated long-chain amines, such as e.g. stearylamine, and ethoxylated or ethoxylated/propoxylated abietic acid.

Further surface-active substances, such as e.g. polyvinyl alcohols, polyvinylpyrrolidone and polyacrylic acid salts, can also optionally be co-used.

The co-use of small amounts of organic solvents, such as e.g. butyl glycol, xylene, toluene, methoxypropyl acetate, methyl isobutyl ketone, methoxypropanol, butyl glycol acetate or N-methylpyrrolidone, is possible. Preferably, however, the copolymers according to the invention are prepared without the use of organic solvents, so that the emulsions contain no volatile organic substances, apart from the neutralizing amines optionally added.

Suitable hardening monomers a1) for the preparation of the emulsion polymers according to the invention for filler compositions can be e.g.:
methacrylic acid esters with C1- to C6-alkyl side chains or cycloaliphatic or aromatic side groups, such as e.g. methyl methacrylate, ethyl methacrylate, n-propyl methacrylate, iso-propyl methacrylate, n-butyl methacrylate, iso-butyl methacrylate, tert-butyl methacrylate, n-pentyl methacrylate, iso-pentyl methacrylate, n-hexyl methacrylate, cyclohexyl methacrylate, norbornyl methacrylate, isobornyl methacrylate and phenyl methacrylate, vinylaromatics, such as e.g. styreneamethyl-styrene and vinyl toluene, and also acrylonitrile, methacrylonitrile, dimethyl maleate, diethyl maleate and mixtures of the monomers mentioned, optionally also with other hardening monomers.

Monomers a1) which are preferably used are methyl methacrylate, n-butyl methacrylate and styrene and mixtures thereof.

The emulsion copolymers employed for the preparation of the filler compositions according to the invention preferably comprise at least 40, particularly preferably at least 55 wt. % styrene, based on the total monomer amount of a1) to a5) employed, in a polymerized-in form.

It has been found, surprisingly, that filler compositions prepared in such a manner are distinguished by a particularly high hardness and a particularly rapid drying and sandability. This is surprising because polymers based on the same amounts, e.g. of methyl methacrylate, which have absolutely comparable molecular weights and comparable glass transition temperatures which can be determined mathematically and, on comparison of the drying of the pure emulsion polymers, show an equally rapid drying, are indeed likewise particularly suitable for the preparation of filler compositions but are inferior to the products based on styrene in respect of hardness, rapid drying and rapid sandability.

Suitable plasticizing monomers a2) for the preparation of the emulsion copolymers according to the invention for filler compositions can be e.g.:

acrylic acid esters, such as methyl acrylate, ethyl acrylate, n-propyl acrylate, isopropyl acrylate, n-butyl acrylate, isobutyl acrylate, tert-butyl acrylate, n-pentyl acrylate, isopentyl acrylate, n-hexyl acrylate, cyclohexyl acrylate, n-heptyl acrylate, nonyl acrylate, n-octyl acrylate, 2-ethylhexyl acrylate, decyl acrylate, iso-decyl acrylate, dodecyl acrylate, lauryl acrylate, stearyl acrylate, norbornyl acrylate, methoxypolypropylene glycol acrylate, methoxypolyethylene glycol acrylate, isobornyl acrylate, oleyl acrylate and palmityl acrylate, methacrylic acid esters with $C_7$- to $C_{22}$-alkyl side chains, such as n-heptyl methacrylate, nonyl methacrylate, n-octyl methacrylate, 2-ethylhexyl methacrylate, decyl methacrylate, iso-decyl methacrylate, dodecyl methacrylate, lauryl methacrylate, stearyl methacrylate, methoxypolyethylene glycol methacrylate, methoxypolypropylene glycol methacrylate, oleyl methacrylate and palmityl methacrylate, and furthermore di-n-butyl maleate and mixture of the monomers mentioned, optionally also with other plasticizing monomers.

Monomers a2) which are preferably used are n-butyl acrylate, 2-ethylhexyl acrylate, ethyl acrylate and 2-ethylhexyl methacrylate.

Monomers which are designated plasticizing monomers here are substantially those which lead to homopolymers having a glass transition temperature below 0° C. Monomers which are designated hardening monomers here are substantially those of which the homopolymers have glass transition temperatures above 0° C.

Suitable hydroxy-functional monomers a3) for the preparation of the emulsion copolymers according to the invention for filler compositions can be e.g.: hydroxy-functional acrylic acid or methacrylic acid esters, such as hydroxyethyl acrylate, hydroxyethyl methacrylate, hydroxypropyl acrylate, hydroxypropyl methacrylate, hydroxybutyl acrylate, hydroxybutyl methacrylate, polypropylene glycol monoacrylate, polypropylene glycol monomethacrylate, polyethylene glycol monoacrylate, polyethylene glycol monomethacrylate, polyethylene glycol-polypropylene glycol monomethacrylate and polyethylene glycol-polypropylene glycol monoacrylate, reaction products of methacrylic acid or acrylic acid and Cardura E10 (glycidyl ester of versatic acid), reaction products of the monomers mentioned and also other hydroxy-functional copolymerizable monomers withεcaprolactone, and mixtures of the monomers mentioned, also with other hydroxy-functional monomers.

The hydroxyl group content of polymers a) is 0 to 8, preferably 0 to 5, particularly preferably 0.2 to 3.5 wt. %.

Suitable acid-functional monomers a4) for the preparation of the emulsion copolymers according to the invention for filler compositions can be e.g.:

acrylic acid, methacrylic acid, maleic acid, maleic anhydride, fumaric acid, crotonic acid, maleic acid monoalkyl esters, fumaric acid monoalkyl esters, itaconic acid and propylacrylic acid.

The term acid-functional monomers is also intended to include monomers with acid anhydride groups or with blocked acid groups or with potential acid groups.

Monomers a4) which are preferably used are carboxyl-functional monomers, in particular acrylic acid or methacrylic acid.

Acid groups, in particular carboxyl groups, in the emulsion copolymers employed for the preparation of the filler compositions according to the invention can be converted completely or partly into salt groups before, during or preferably after the polymerization. Neutralizing agents which are suitable for this are e.g. ammonia, triethylamine, dimethylethanolamine, N-methylmorpholine, dimethyl isopropylamine, N-methyldiethanolamine, triethanolamine, aminomethyl-1-propanol, dimethylisopropanolamine, sodium hydroxide solution and potassium hydroxide solution. The use of ammonia, triethylamine, N-methylmorpholine and dimethylisopropylamine is preferred. The preferred degree of neutralization is 20 to 110%, particularly preferably 35 to 75%, i.e. in this case 25 to 70% of the acid groups incorporated remain in the polymer as non-neutralized acid.

In the case of amounts of up to 1.5 wt. % carboxyl-functional monomers, these are preferably in the neutralized form to the extent of at least 50%.

Suitable other monomers a5) for the preparation of the emulsion copolymers according to the invention for filler compositions can be e.g.:

vinyl chloride, vinylidene chloride, N-methylolacrylamide, acrylamide, methacrylamide, N-methylolmethacrylamide, diacetone-acrylamide, glycidyl methacrylate, glycidyl acrylate, N-vinylpyrrolidone, acetoacetylethyl methacrylate, acetoacetylethyl acrylate, isocyanatoethyl methacrylate, N,N'-dimethylaminomethacrylate, vinyltriethoxysilane, vinyltrimethoxysilane, methacryloxypropyltrimethoxysilane, vinyl ethers, allyl ethers, allyl esters, vinyl esters, vinyl acetate and vinyl butyrate.

Other monomers a5) can also be oligomeric or polymeric substances with at least one copolymerizable group, and substances with more than one copolymerizable group, such as e.g. divinylbenzene, 1,6-hexanediol bisacrylic acid ester, trimethylolpropane trisacrylic acid ester, ethoxylated bisphenol A dimethacrylate, triethylene glycol dimethacrylate, polyethylene glycol dimethacrylate, dicyclopentadienyl methacrylate, trimethylolpropane-diallyl ether, butadiene, cyclooctatetraene, polybutadienes, reaction products of polyesters or polyethers or polyepoxides with methacrylic acid and/or acrylic acid and reaction products of polyisocyanates with hydroxyethyl acrylate and/or hydroxyethyl methacrylate and/or hydroxypropyl acrylate and/or hydroxypropyl methacrylate and/or hydroxybutyl acrylate and/or hydroxybutyl methacrylate.

The choice of monomers a1) to a5) here is such that stable emulsions are formed. The emulsion copolymers have molecular weights of preferably >25,000 g/mol, particularly preferably >50,000 g/mol. All the molecular weights stated are weight-average. The molecular weights can be determined e.g. by gel permeation chromatography.

To achieve particular properties, it is also possible to employ polymer mixtures of emulsion copolymers with and without isocyanate-reactive groups, in particular also emulsion copolymers without hydroxyl groups.

Especially preferred emulsion copolymers a) have a solids content of 30 to 55%, a viscosity of 10 to 5,000 mPas/23° C., an acid number of 5 to 30 mg KOH/g, based on a solids content of 100%, a hydroxyl group content of 0.2 to 3.5 wt.

%, based on a solids content of 100%, and a pH of 5.5 to 9, and comprise, in an incorporated form a1) 50 to 85 wt. % styrene, methyl methacrylate and/or butyl methacrylate, the copolymers comprising at least 40, preferably at least 55 wt. % styrene, a2) 5 to 30 wt. % n-butyl acrylate, ethyl acrylate and/or 2-ethylhexyl acrylate, a3) 2 to 30 wt. % hydroxypropyl methacrylate, hydroxyethyl methacrylate, hydroxypropyl acrylate and/or hydroxyethyl acrylate, a4) 1 to 4 wt. % acrylic acid and/or methacrylic acid, wherein at amounts of up to 1.5 wt. % these are present in the neutralized form to the extent of at least 50%, the sum of the % figures of a1) to a4) being 100, and wherein 1.0 to 2.0 wt. %, based on the total amount of monomers, of emulsifier or emulsifier mixtures and 0.15 to 0.45 wt. %, based on the total amount of monomers, of initiator or initiator mixtures is employed.

Suitable polyisocyanates b) are polyisocyanates with free isocyanate groups based on aliphatic, cycloaliphatic, aromatic-aliphatic and/or aromatic mono- di- and/or triisocyanates. The polyisocyanates in general have a viscosity at 23° C. of 10 to 20,000, preferably 10 to 10,000 mPas. If necessary, the polyisocyanates can be employed as a mixture with small amount of inert solvents, in order to lower the viscosity to a value within the range mentioned.

Suitable monomeric isocyanates for the preparation of polyisocyanates b) are e.g. 1,6-hexamethylene-diisocyanate, 1,4-butane-diisocyanate, isophorone-diisocyanate, bis-(4-iso-yanato-cyclohexyl)methane, 1,4-bis-isocyanatocyclohexane, 2,4- and/or 2,6-toluylene-diisocyanate, hexahydro-4- and/or 2,6-toluylene-diisocyanate, xylylene-diisocyanate, m- and p-tetramethylxylylene-diisocyanate, 1,3- or 1,4-bis-(2-isocyanatoethyl)cyclohexane, bis-(2-isocyanatophenyl) methane, bis-(4-isocyanatophenyl)-methane, nonane-triisocyanate, 1,5-diisocyanato-2,2-dimethylpentane, 2,2,4- or - 2,4,4-trimethyl-1,6-diisocyanatohexane, 1,10-diisocyanatodecane, hexahydroxylylene-diisocyanate, tetramethylxylylened iisocyanate, 4,(3)-Isocyanatomethylcyclohexyl isocyanate, butane-isocyanate, phenyl isocyanate, stearyl isocyanate and other isocyanates, such as are described e.g. in "Methoden der organischen Chemie" Houben-Weyl, vol. 14/2, 4th edition, Georg Thieme Verlag, Stuttgart 1963, p. 61–70. Mixtures of the isocyanates mentioned and also other isocyanates can also be employed. Preferred diisocyanates are hexamethylene-diisocyanate, isophorone-diisocyanate and/or toluylene diisocyanate, and the preferred triisocyanate is nonane-triisocyanate.

Suitable polyisocyanates are prepared by methods known from the literature from the diisocyanates and/or triisocyanates mentioned or also from other diisocyanates and/or triisocyanates, optionally co-using mono- and/or triisocyanates or co-using monoalcohols, diols and/or polyols, and have e.g. isocyanurate, biuret, allophanate, iminooxadiazinedione, carbodiimide, uretdione, urethane and/or urea structural units. Polyisocyanates with more than 65% aliphatic and/or cycloaliphatically bonded isocyanate end groups and isocyanurate, allophanate, iminooxadiazinedione and/or urethane structural units are preferably employed. Especially preferred polyisocyanates contain as isocyanate units, optionally in addition to other, as a rule hydroxy-functional units, hexamethylene-diisocyanate, mixtures of hexamethylene-diisocyanate and isophorone-diisocyanate or isophorone-diisocyanate as the starting material.

The diisocyanates used for the preparation of the polyisocyanates can in principle also be employed directly as polyisocyanate b), but this is not preferred.

Polyisocyanate components b) can be employed as hydrophobic polyisocyanates, that is to say as polyisocyanates containing no hydrophilic structural units which assist or allow the dispersion operation. In this case, preferably polyisocyanates with viscosities of <1,500, especially preferably with viscosities of <500 mPas/23° C. are employed. This ensures good mixing with the reaction partners, even under low shear forces. If the intrinsic viscosity of the hydrophobic polyisocyanates is not in the preferred viscosity range, this is preferably established by addition of suitable diluents.

Preferred hydrophobic polyisocyanate components b) are e.g. low-viscosity hexamethylene-diisocyanate trimers, such as e.g. Desmodur® VP LS 2025/1 (Bayer AG), low-viscosity hexamethylene-diisocyanate polyisocyanates with uretdione and/or allophanate and/or trimer structural units, such as e.g. Desmodur® N 3400 (Bayer AG) and Desmodur VP LS 2102 (Bayer AG), and in particular nonanetriisocyanate.

Polyisocyanate components b) can also be employed as hydrophilic polyisocyanates. Hydrophilization is possible e.g. by reaction of the polyisocyanates with a deficit of hydrophilizing polyether-alcohols, e.g. based on ethylene oxide or ethylene oxide/propylene oxide, which contain one or two isocyanate-reactive groups, preferably hydroxyl groups. The preparation of such hydrophilized polyisocyanates is described, for example, in EP-A 540 985.

Hydrophilization by means of the polyethers described above by reaction of a deficit of these polyethers, using suitable catalysts, such as e.g. zinc(II) 2-ethyl-1-hexanoate, with polyisocyanates, in particular polyisocyanates with isocyanurate, biuret, urethane and/or iminooxadiazinedione structural units, to form hydrophilizing allophanate structural units ("allophanate hydrophilization") is also possible. By this allophanate hydrophilization it is possible e.g. to hydrophilize two triply isocyanate-functional isocyanurate structural units by means of one polyether molecule. Such products are distinguished e.g. in that because of the special preparation process and the special structure of the hydrophilic groups, a particularly effective hydrophilization and furthermore an increased functionality is present.

It has been found that corresponding polyisocyanate components b) allow the preparation of filler compositions according to the invention with a particularly high level of properties, in particular in respect of hardness, sandability, resistance properties and adhesion. Such polyisocyanates b) modified by allophanate hydrophilization are therefore especially preferably employed.

Hydrophilization by addition of external emulsifiers of an ionic and/or nonionic nature to the polyisocyanates is also possible.

The use of polyisocyanates ionically hydrophilized internally, which can be obtained e.g. by reaction of polyisocyanates with optionally neutralized acids containing hydroxyl or amino groups, is also possible.

The use of polyisocyanates which have undergone both a hydrophilic and a hydrophobic modification, e.g. by reaction with long-chain monoalcohols, is also possible.

The use of polyisocyanates or polyisocyanate mixtures which have been hydrophilized by various of the modifications mentioned and also other modifications is also possible.

If necessary, the incorporation of hydrophilic polyisocyanates for the preparation of the filler compositions according to the invention can also be optimized by lowering the viscosity by means of addition of organic diluents.

Depending on the profile of requirements, both polyisocyanates hydrophilized to a low degree, that is to say with less than 5 wt. % hydrophilic groups, and normally hydrophilized, that is to say with 5 to 20 wt. % hydrophilic groups, and highly hydrophilized polyisocyanates, that is to say with more than 20 wt. % hydrophilic groups, can be employed.

Mixtures of various polyisocyanates, e.g. mixtures of a hydrophobic and a hydrophilic polyisocyanate, or mixtures of polyisocyanates based on various diisocyanates, such as e.g. a mixture of a cycloaliphatic polyisocyanate and an aliphatic polyisocyanate, can also be employed.

In a preferred embodiment, polyisocyanates hydrophilized with polyether to a low degree or normally and based on hexamethylene-diisocyanate or isophorone-diisocyanate, optionally in a mixture with low-viscosity, hydrophobic polyisocyanates based on hexamethylene-diisocyanate, or in a mixture with nonane-triisocyanate, are employed.

The use of polyisocyanates hydrophilized via allophanate formation and based on hexamethylene-diisocyanate, optionally in a mixture with low-viscosity hexamethylene-diisocyanate trimers, such as e.g. Desmodur® VP LS 2025/1 (Bayer AG), or/and low-viscosity hexamethylene-diisocyanate polyisocyanates with uretdione and/or allophanate structural units, such as e.g. Desmodur® N 3400 (Bayer AG) or Desmodur® VP LS 2102 (Bayer AG), is especially preferred.

The use of optionally hydrophilically modified hexamethylene-diisocyanate polyisocyanates with iminooxadiazinedione structural units, optionally in combination with other polyisocyanates, is also especially preferred.

At least 0.5 equivalent of polyisocyanate b) is employed per equivalent of isocyanate-reactive groups in polymer a) and in optionally co-used component e). Preferably, 0.8 to 2.0, particularly preferably 1 to 1.4 equivalents of polyisocyanate b) are employed per equivalent of hydroxyl groups in polymer a). In the case where polymers without hydroxyl groups are used, polyisocyanate b) is used at least in an amount as if the polymer were to contain 1 wt. %, preferably 2 or more wt. % hydroxyl groups.

The functionalities of the polyisocyanates can in principle be chosen as desired. Suitable polyisocyanates are e.g. those with functionalities of 1.5 to 7.5, preferably 2.0 to 6.5, and particularly preferably 2.4 to 5.5.

Suitable components c)—pigments, fillers, extenders or colouring or other additives—can be e.g.:
talc, zinc oxides, zinc phosphates, barite, kaolin, silicon oxides, silicates, iron oxides, chromium oxides, titanium dioxides, other inorganic or also organic coloured pigments, micronized talc, chalk, calcium carbonate, dolomite, calcite, aluminium hydroxide. barium sulfate, aluminium silicates, magnesium silicates, feldspar, micaceous iron ore, glass fibres and glass beads.

Components c) which the compositions can preferably comprise are: a talc for good sandability, a talc for a high degree of filling, admixed extenders, such as calcium carbonate or barium sulfate, an anticorrosion pigment, such as e.g. zinc phosphate/zinc oxide for metallic substrates, and a colouring inorganic pigment, such as e.g. titanium dioxide.

The aqueous reactive filler compositions according to the invention can be optimized in respect of adhesion and sandability within wide limits by proper choice of the types and amounts of talc employed. Dolomite, calcite or barite give the filler a compact structure, which is very important e.g. for fine fillers. Barite flours (as far as possible with a low iron content) improve the deformability of the fillers. Colouring pigments which are preferably employed are inorganic pigments, such as e.g. Bayertitan rutile types, chromium oxide and/or Bayferrox® iron oxide types, in small amounts, preferably less than 10 wt. %, based on the total amount of components c).

In terms of amount, component(s) c) are the main component of the fillers according to the invention.

Based on the solids contents, the weight ratio of c) to all other components is 1.3 to 20:1, preferably 1.5 to 15:1, and especially preferably 2.1 to 10:1.

Suitable components d)—auxiliary substances, additional substances and additives—can be e.g.:
defoamers, flow auxiliaries, antisedimentation agents, catalysts, deaerating auxiliaries, stabilizers to prevent/reduce degradation by UV radiation or oxidative degradation, thickeners, rheology auxiliaries, thixotropic auxiliaries, wetting auxiliaries, dispersing auxiliaries, preservatives, emulsifiers, protective colloids, antifoams, corrosion inhibitors, antiflotation agents and antiskinning agents.

Components d) which are preferably employed are e.g. antisedimentation agents, thickeners, wetting auxiliaries, defoamers and thixotropic auxiliaries.

Components e) which are optionally to be co-used can be e.g. oligomeric and/or polymeric products 100% present in dissolved form or in the form of optionally aqueous dispersions or emulsions, such as e.g. polyurethanes, polurethanepolyureas, polyureas, polymers, acrylate copolymers, styrene-containing polymers, polyolefin resins, polybutadiene resins, polyesters, unsaturated polyesters, alkyd resins, polymers which are capable of oxidative crosslinking, products containing allyl ethers, cellulose and cellulose derivatives, melamine-aldehyde resins, urea resins, polyepoxides, products containing carbodiimide structures, polyamines, products containing thiol groups, reactive diluents with at least two isocyanate-reactive groups, such as e.g. liquid diols, triols, tetraols, amino alcohols, diamines or polyamines, in particular in the form of aspartic acid esters of reduced reactivity, e.g. obtainable by reaction of primary amines which are at least difunctional with maleic acid dialkyl esters, products with a plasticizing action, such as e.g. dibutyl phthalate or dioctyl phthalate, chlorinated rubber, polyvinyl chloride, polyvinyl alcohol, polyvinyl esters, polyvinylpyrrolidone, products containing alkoxysilane structures, fluorine-containing products, substances containing blocked isocyanate groups, phenolic resins, carboxyl-functional polymers or oligomers, epoxy-functional polymers or oligomers, carbodiimide-functional oligomers or polymers, polyamide resins, silicone resins, water-glass and polymers or oligomers based on silicic acid esters, silica sols and silica gels.

By addition of components e), specific properties of the filler compositions according to the invention can be established, if this is necessary for particular requirements, such as e.g. high elasticity at low temperatures or long-term elasticity by co-using specific linear, aliphatic polyurethanes, e.g. for use on highly elastic plastics, high surface smoothness and a soil-repellent action by fluorine-containing substances, a very high crosslinking density by high-functionality, low molecular weight reactive diluents, two-phase systems or networks, wettability, optimization of the wet adhesion or adhesion of the filler composition to critical substrates by polybutadiene resins, specific hydrophobicity by polyolefin resins, overpaintability, matting properties, rheological properties, processability, specific filler consistency and processing time.

Epoxy- and/or carbodiimide-functional oligomers or polymers can be added as components e) e.g. to react with carboxyl groups of copolymer component a) to form a second network in addition to the polyurethane or polyurethane-polyurea network. As a result, e.g. filler compositions with particularly high resistance properties and a very high hardness or crosslinking density can be obtained.

A suitable process for the preparation of reactive filler compositions is characterized in that a component which makes up at least 85 wt. % of the filler composition according to the invention is first prepared with the consistency required for processing appropriate in practice from at least one polymer a) present as a dispersion or emulsion with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 20 wt. %, based on the total solids content, of an organic solvent and/or water f) in a suitable technical apparatus, and this is then mixed homogeneously, directly before use, with the second component, which makes up not more than 15 wt. % of the filler composition according to the invention, that is to say at least one polyisocyanate crosslinking agent b), to give the filler composition according to the invention. Another suitable process for the preparation of reactive filler compositions is characterized in that a component which makes up 90.2 to 99 wt. % of the filler composition according to the invention is first prepared with the consistency required for processing appropriate in practice from at least one emulsion copolymer a) containing isocyanate-reactive groups with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 20 wt. %, based on the total solids content, of an organic solvent and/or water f) in a suitable technical apparatus, and this is then mixed homogeneously, directly before use, with the second component, which makes up 9.8 to 1 wt. % of the filler composition according to the invention, that is to say at least one polyisocyanate crosslinking agent b), to give the filler composition according to the invention.

Another suitable process for the preparation of reactive filler compositions is characterized in that a component which makes up 95.1 to 99 wt. % of the filler composition according to the invention is first prepared with the consistency required for processing appropriate in practice from at least one emulsion copolymer a) containing isocyanate-reactive groups with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 10 wt. %, based on the total solids content, of an organic solvent and/or water f) in a suitable technical apparatus, and this is then mixed homogeneously, directly before use, with the second component, which makes up 4.9 to 1 wt. % of the filler composition according to the invention, that is to say at least one polyisocyanate crosslinking agent b), to give the filler composition according to the invention.

Another suitable process for the preparation of reactive filler compositions is characterized in that the filler composition according to the invention is first prepared, directly before use of the filler composition, from at least one polymer a) containing isocyanate-reactive groups and present as a dispersion or emulsion with pigment or pigment mixtures, filler substances or filler substance mixtures c), optionally additives, auxiliary substances and additional substances d), optionally further oligomers or polymers e) optionally present in the form of an aqueous solution, dispersion or emulsion, optionally up to 10 wt. %, based on the total solids content, of an organic solvent and/or water f) and at least one polyisocyanate crosslinking agent b) in a suitable technical apparatus, and this is then optionally adjusted to the required processing consistency by addition of water and/or an organic solvent.

Components a), b), c), d) and e) can in principle be employed or added in any desired sequence during the preparation of the filler compositions according to the invention. The optimum process is to be determined in the individual case and depends e.g. on the particular profile of requirements of the filler and the reactivity of the individual raw materials.

By suitable choice of the raw materials and by the additives, filler substances and pigments, the aqueous reactive 2-component binder combinations according to the invention offer the possibility of preparation of both very highly reactive aqueous filler compositions with an exceptionally rapid sandability, with then a relatively short processing time, and aqueous filler composition with a relatively long processing time and nevertheless a good reactivity or sandability.

By suitable choice of the raw materials, such as e.g. preferably aliphatic polyisocyanates and suitable acrylic acid or methacrylic acid esters, it is also possible to prepare light-fast aqueous reactive filler compositions which show no discoloration, chalking or degradation phenomena under the conditions of the various applications of filler compositions.

With the filler compositions according to the invention it is thus possible to meet practically all conceivable profiles of requirements for filler compositions, including those which have not been mentioned by way of example here.

The filler compositions according to the invention comprise only small amounts of volatile organic substances. The content thereof is preferably less than 12, especially preferably less than 5 wt. %.

Suitable technical apparatuses for the preparation of the aqueous reactive filler compositions according to the invention can be e.g.: kneaders, mixers, such as e.g. planetary mixers or butterfly mixers, and dissolvers.

The aqueous reactive filler compositions according to the invention can be applied, for example, as knifing fillers, brushable fillers, pourable fillers or sprayable fillers. Curing of the aqueous reactive filler compositions according to the invention can take place at 0 to 80° C., preferably at room temperature. Curing at higher temperatures or, in particular, with the use of IR driers or also by microwave driers is also possible.

The aqueous reactive 2-component binder combinations according to the invention are outstandingly suitable in or as aqueous reactive filler compositions or repair filler compositions e.g. for wood, woody substrates and/or cork, for metallic substrates, vehicle bodies and/or plastics, and for marble, granite, concrete and mineral substrates.

Filler compositions are used e.g. to reduce the absorption capacity of absorbent substrates, for filling and smoothing edges and surfaces, for filling up indentations, hollow spaces, pores, dents and scratches up to holes.

Car repair fillers thus allow e.g. flat and smooth surfaces to be re-established for subsequent painting, which usually comprises primer, filler and top coat(s).

Marble fillers thus allow, after filling up of indentations, hollow spaces and pores, cutting, sanding and polishing of the workpieces to smooth, high-quality marble components which can be used e.g. as floor, stair or window sill covering.

Wood fillers thus allow e.g. filling and smoothing of defects, knotholes etc. in wood or derived timber products, so that uniform, flat, high-quality painting can subsequently take place.

The aqueous reactive filler compositions according to the invention are distinguished by rapid drying and curing even in thick layers and processing times appropriate in practice, by a high hardness, by good adhesion, also on critical substrates, by good resistance properties, by a very rapid and very good sandability, by a good processability, in particular deformability and a filler consistency appropriate in practice, by a high filling power, by the possibility of formulating light-fast filler compositions, and overall by a high variability.

Aqueous reactive filler compositions here are to be understood as aqueous filler compositions which comprise 2-component binder combinations and, in addition to at least one copolymer a), comprise at least one reactive crosslinking agent with free isocyanate groups b), and react to form a polyurethane or polyurethane-polyurea network. The binder combinations according to the invention for filler compositions and the filler compositions prepared with them have a limited pot life or a limited processing time. By choosing suitable raw materials in the preparation of a) or b) and by choosing the nature and amount in particular of component c) and also d) and optionally e), it is possible to match the reactivity and the pot life or processing time to the particular requirements. Exceptionally reactive systems and also systems with a longer processing time and nevertheless good reactivity can be prepared.

The aqueous reactive 2-component binder combinations according to the invention and the aqueous reactive filler compositions prepared therefrom are also suitable for use in plugging compositions and as thick-layered fillers. The aqueous reactive 2-component binder combinations according to the invention are also suitable for use in or for the preparation of glass fibre-reinforced plastics or glass fibre-reinforced sheet-like structures or casting compositions.

EXAMPLES

Component b):
Polyisocyanate 1)
Allophanate-hydrophilized polyisocyanate 1) based on hexamethylene-diisocyanate:
850 g of a hexamethylene-diisocyanate trimer (Desmodur® N 3300, Bayer AG) are initially introduced, under dry nitrogen and together with 0.05 g dibutyl phosphate (stabilizer) and 0.4 g zinc(II) 2-ethyl-1-hexanoate (allophanating catalyst), into a stirred vessel with a stirring, cooling and heating device at 100° C. 150 g of a polyethylene glycol monomethyl ether (Pluriol® A 500E, OH number 112 mg KOH/g, BASF AG) are then metered in within 40 minutes such that the reaction temperature does not exceed 105° C. After the end of the addition of the polyether, the mixture is stirred at 100° C. for a further 2 to 3 hours until the isocyanate content of 15.9% corresponding theoretically to a complete allophanation is reached. The catalyst is then deactivated by addition of 0.1 g benzoyl chloride and the reaction mixture is cooled to room temperature. A water-dispersible, hydrophilized polyisocyanate with a viscosity of approx. 6,000 mPas/23° C., an isocyanate functionality of 4 and an isocyanate content of 15.9% is obtained.

Polyisocyanate 2)
Hydrophobic, low-viscosity polyisocyanate 2):
4-Isocyanatomethyl-1,8-octane-diisocyanate (nonane-triisocyanate, Bayer AG), viscosity 12 mPas/23° C., isocyanate functionality 3, isocyanate content 50.1%.
Polyisocyanate 3)
Hydrophilic polyisocyanate 3):
Hydrophilized polyisocyanate obtained by reaction of an isophorone-diisocyanate trimer with a polyether under urethanization conditions. Dissolved to 70% in methoxypropyl acetate/xylene, viscosity 500 mPas/23° C., isocyanate content 9.5% (Bayhydur® VP LS 2150/1, Bayer AG).
Polyisocyanate 4)
Hydrophobic, low-viscosity polyisocyanate 4):
Polyisocyanate based on hexamethylene-diisocyanate containing uretdione structural units. Viscosity 200 mPas/23° C., isocyanate functionality 2.4, isocyanate content 22.0% (Desmodur® N 3400, Bayer AG).
Polyisocyanate 5)
Hydrophobic polyisocyanate 5):
Hexamethylene-diisocyanate trimer with iminooxadiazinedione structural units. Viscosity 1,000 mPas/23° C., isocyanate content 23.3% (Desmodur® VP LS 2294, Bayer AG).
Polyisocyanate 6)
Hydrophilic polyisocyanate 6):
Hydrophilized polyisocyanate obtained by reaction of a hexamethylene-diisocyanate trimer with a polyether under urethanization conditions. Viscosity 3,000 mPas/23° C., isocyanate content 17.0% (Bayhydur® 3100, Bayer AG).
Components a)

Example 7)
(Emulsion copolymer 7):
880 g triply desalinated water and 9 g of an emulsifier with ionic and nonionic groups (Emulsifer 951, alkyl polyglycol ether-sulfate ammonium salt, Bayer AG) are weighed into a 3 l reaction vessel with a stirring, cooling and heating device and flushed with nitrogen, and are heated to 75° C. under a gentle stream of nitrogen. 0.35 g tert-butyl hydroperoxide, 0.88 g of a solution of 0.1 g iron(II) sulfate and 2.0 g Trilon® B in 100 g water and a solution of 0.22 g Rongalit® C in 4.8 g water are then added in succession. From a monomer mixture of 31 g acrylic acid, 100 g n-butyl acrylate, 611 g styrene and 258 g hydroxypropyl methactylate, 100 g are then metered in over a period of 5 minutes and the reaction mixture is stirred at 75° C. for 30 minutes. The remaining 900 g of the monomer mixture are then metered in over a period of 4 hours. In parallel with this, 2.64 g tert-butyl hydroperoxide and 6.8 g of the iron(II) sulfate/Trilon B solution in 232 g water, and 2.0 g Rongalit C and 8.8 g Emulsifier 951 in 232 g water are metered in. When the addition has ended, the mixture is subsequently stirred at 75° C. for 2 hours and cooled to 45° C., a solution of 14.9 g 25% aqueous ammonia in 25 g water is then added and the mixture is homogenized. After cooling to 40° C., the mixture is filtered. Emulsion copolymer 7) with a solids content of 43%, a viscosity at 23° C. of 350 mPas and a pH of 8.3 is obtained. The hydroxyl group content of the solid is 2 wt. %.

Example 8
(Emulsion copolymer 8):
840 g triply desalinated water and 9.5 g of an emulsifier with ionic and nonionic groups (Emulsifer 951, Bayer AG) are weighed into a 3 l reaction vessel with a stirring, cooling and heating device and flushed with nitrogen, and are heated to 75° C. under a gentle stream of nitrogen. 0.35 g tert-butyl hydroperoxide, 0.88 g of a solution of 0.1 g iron(II) sulfate and 2.0 g Trilon B in 100 g water and a solution of 0.22 g Rongalit C in 4.8 g water are then added in succession. 100 g of a 1st monomer mixture of 19 g acrylic acid, 287 g n-butyl acrylate, 272 g styrene and 22 g hydroxypropyl methacrylate are then metered in over a period of 5 minutes and the reaction mixture is stirred at 75° C. for 30 minutes. The remaining 500 g of the 1st monomer mixture are then metered in over a period of 135 minutes. Directly thereafter, a 2nd monomer mixture comprising 12 g acrylic acid, 238 g methyl methacrylate and 150 g hydroxypropyl methacrylate is metered in over a period of 105 minutes. In parallel with the addition of the 1st and 2nd monomer mixture, 2.64 g tert-butyl hydroperoxide and 6.8 g of the iron(II) sulfate/Trilon® B solution in 232 g water, and 2.0 g Rongalit C and 9.5 g Emulsifier 951 in 232 g water are metered in over a period of 4 hours. When the addition has ended, the mixture is subsequently stirred at 75° C. for 2 hours and cooled to 45° C., a solution of 14.9 g 25% aqueous ammonia in 25 g water is then added and the mixture is homogenized. After cooling to 40° C., the mixture is filtered. Emulsion copolymer 8) with a solids content of 43%, a viscosity at 23° C. of 1,000 mPas and a pH of 7.5 is obtained. The hydroxyl group content of the solid is 3 wt. %.

Example 9
(Emulsion copolymer 9):
850 g triply desalinated water and 9.5 g of an emulsifier with ionic and nonionic groups (Emulsifer 951, Bayer AG) are weighed into a 3 l reaction vessel with a stirring, cooling and heating device and flushed with nitrogen, and are heated to 75° C. under a gentle stream of nitrogen. 0.35 g tert-butyl hydroperoxide, 0.88 g of a solution of 0.1 g iron(II) sulfate and 2.0 g Trilon B in 100 g water and a solution of 0.22 g Rongalit® C in 4.8 g water are then added in succession. From a monomer mixture of 31 g acrylic acid, 100 g n-butyl acrylate, 510 g styrene and 172 g hydroxypropyl methacrylate, 100 g are then metered in over a period of 5 minutes and the reaction mixture is stirred at 75° C. for 30 minutes. The remaining 900 g of the monomer mixture are then metered in over a period of 4 hours. In parallel with this, 2.64 g tert-butyl hydroperoxide and 6.8 g of the iron(II) sulfate/Trilon® B solution in 232 g water, and 2.0 g Rongalit C and 9.5 g Emulsifier 951 in 232 g water are metered in. When the addition has ended, the mixture is subsequently stirred at 75° C. for 2 hours and cooled to 45° C., a solution of 14.9 g 25% aqueous ammonia in 25 g water is then added and the mixture is homogenized. After cooling to 40° C., the mixture is filtered. Emulsion copolymer 9) with a solids content of 43%, a viscosity at 23° C. of 280 mPas and a pH of 8.6 is obtained. The hydroxyl group content of the solid is 2 wt. %.

Example 10
(Emulsion copolymer 10):
800 g triply desalinated water and 9.5 g of an emulsifier with ionic and nonionic groups (Emulsifer 951, Bayer AG) are weighed into a 3 l reaction vessel with a stirring, cooling and heating device and flushed with nitrogen, and are heated to 75° C. under a gentle stream of nitrogen. 0.35 g tert-butyl hydroperoxide, 0.88 g of a solution of 0.1 g iron(II) sulfate and 2.0 g Trilon® B in 100 g water and a solution of 0.22 g Rongalit C in 4.8 g water are then added in succession. From a monomer mixture of 31 g acrylic acid, 287 g n-butyl acrylate, 596 g styrene and 86 g hydroxypropyl methacrylate, 100 g are then metered in over a period of 5 minutes and the reaction mixture is stirred at 75° C. for 30 minutes. The remaining 900 g of the monomer mixture are then metered in over a period of 4 hours. In parallel with this, 2.64 g tert-butyl hydroperoxide and 6.8 g of the iron(II) sulfate/Trilon® B solution in 232 g water, and 2.0 g Rongalit® C and 9.5 g Emulsifier 951 in 232 g water are metered in. When the addition has ended, the mixture is subsequently stirred at 75° C. for 2 hours and cooled to 45° C., a mixture of 10.9 g 25% aqueous ammonia in 25 g water and 13 g triethylamine is then added and the mixture is homogenized. After cooling to 40° C., the mixture is filtered. Emulsion copolymer 10) with a solids content of 44%, a viscosity at 23° C. of 550 mPas and a pH of 7.6 is obtained. The hydroxyl group content of the solid is 1 wt. %.

Example 11
(Emulsion copolymer 11):
900 g triply desalinated water and 9.5 g of an emulsifier with ionic and nonionic groups (Emulsifer 951, Bayer AG) are weighed into a 3 l reaction vessel with a stirring, cooling and heating device and flushed with nitrogen, and are heated to 75° C. under a gentle stream of nitrogen. 0.35 g tert-butyl hydroperoxide, 0.88 g of a solution of 0.1 g iron(II) sulfate and 2.0 g Trilon B in 100 g water and a solution of 0.22 g Rongalit® C in 4.8 g water are then added in succession. From a monomer mixture of 16 g acrylic acid, 224 g 2-ethylhexyl acrylate, 100 g n-butyl methacrylate, 305 g styrene, 200 g methyl methacrylate and 155 g hydroxyethyl methacrylate, 100 g are then metered in over a period of 5 minutes and the reaction mixture is stirred at 75° C. for 30 minutes. The remaining 900 g of the monomer mixture are then metered in over a period of 4 hours. In parallel with this, 2.64 g tert-butyl hydroperoxide and 6.8 g of the iron(II) sulfate/Trilon® B solution in 232 g water, and 2.0 g Rongalit® C and 9.5 g Emulsifier 951 in 232 g water are metered in. When the addition has ended, the mixture is subsequently stirred at 75° C. for 2 hours and cooled to 45° C., 26 g triethylamine are added and the mixture is homogenized. After cooling to 40° C., the mixture is filtered. Emulsion copolymer 11) with a solids content of 41%, a viscosity at 23° C. of 120 mPas and a pH of 8.6 is obtained. The hydroxyl group content of the solid is 1 wt. %.

Example 12
(Emulsion copolymer 12):
984 g triply desalinated water and 8.8 g of an emulsifier with ionic and nonionic groups (Emulsifer 951, Bayer AG) are weighed into a 3 l reaction vessel with a stirring, cooling and heating device and flushed with nitrogen, and are heated to 75° C. under a gentle stream of nitrogen. 0.39 g ammonium peroxodisulfate, dissolved in 5 g water, is then added. From a monomer mixture of 31 g acrylic acid, 287 g n-butyl acrylate, 510 g styrene and 172 g hydroxypropyl methacrylate, 100 g are then metered in over a period of 5 minutes and the reaction mixture is stirred at 75° C. for 30 minutes. The remaining 900 g of the monomer mixture are then metered in over a period of 4 hours. In parallel with this, 2.94 g ammonium peroxodisulfate and 8.8 g Emulsifier 951, dissolved in 233 g water, are metered in. When the addition has ended, the mixture is subsequently stirred at 75° C. for 2 hours and cooled to 45° C., a solution of 12.7 g 25% aqueous ammonia and 6.7 g dimethylethanolamine in 25 g water is then added and the mixture is homogenized. After cooling to 40° C., the mixture is filtered. Emulsion copolymer 12) with a solids content of 44%, a viscosity at 23° C. of 150 mPas and a pH of 7.6 is obtained. The hydroxyl group content of the solid is 2 wt. %.

Comparison Example 13
(Copolymer 13):
Example G from EP-A 358 979 was reworked. A very fine-particled aqueous secondary dispersion or aqueous polymer solution with a solids content of 27%, a viscosity of 6,000 mPas and a pH of 7.1 is obtained. The content of hydroxyl-functional monomers is 30.6 wt. %, and the content of carboxy-functional monomers present in the neutralized form is 10 wt. %. The hydroxyl group content is 4.1 wt. %.

Example 14
(Emulsion copolymer 14)
880 g triply desalinated water and 9 g of an emulsifier with ionic and nonionic groups (Emulsifer 951, Bayer AG) are weighed into a 3 l reaction vessel with a stirring, cooling and heating device and flushed with nitrogen, and are heated to 75° C. under a gentle stream of nitrogen. 0.35 g tert-butyl hydroperoxide, 0.88 g of a solution of 0.1 g iron(II) sulfate and 2.0 g Trilon B in 100 g water and a solution of 0.22 g Rongalit® C in 4.8 g water are then added in succession. From a monomer mixture of 31 g acrylic acid, 327 g n-butyl acrylate and 642 g styrene, 100 g are then metered in over a period of 5 minutes and the reaction mixture is stirred at 75° C. for 30 minutes. The remaining 900 g of the monomer mixture are then metered in over a period of 4 hours. In parallel with this, 2.64 g tert-butyl hydroperoxide and 6.8 g of the iron(II) sulfate/Trilon® B solution in 232 g water, and 2.0 g Rongalit® C and 8.8 g Emulsifier 951 in 232 g water are metered in. When the addition has ended, the mixture is subsequently stirred at 75° C. for 2 hours, cooled to 40° C. and filtered. Emulsion copolymer 14) with a solids content of 43%, a viscosity at 23° C. of 90 mPas and a pH of 7.4 is obtained.

Example 15
(Emulsion copolymer 15)
880 g triply desalinated water and 9 g of an emulsifier with ionic and nonionic groups (Emulsifer 951, Bayer AG) are weighed into a 3 l reaction vessel with a stirring, cooling and heating device and flushed with nitrogen, and are heated to 75° C. under a gentle stream of nitrogen. 0.35 g tert-butyl hydroperoxide, 0.88 g of a solution of 0.1 g iron(II) sulfate and 2.0 g Trilon B in 100 g water and a solution of 0.22 g Rongalit® C in 4.8 g water are then added in succession. From a monomer mixture of 31 g acrylic acid, 287 g n-butyl acrylate, 172 g hydroxypropyl methacrylate, 100 g methyl methacrylate and 410 g styrene, 100 g are then metered in over a period of 5 minutes and the reaction mixture is stirred at 75° C. for 30 minutes. The remaining 900 g of the monomer mixture are then metered in over a period of 4 hours. In parallel with this, 2.64 g tert-butyl hydroperoxide and 6.8 g of the iron(II) sulfate/Trilon® B solution in 242 g water, and 2.0 g Rongalit® C and 8.8 g Emulsifier 951 in 232 g water are metered in. When the addition has ended, the mixture is subsequently stirred at 75° C. for 2 hours, cooled to 40° C. and filtered. Emulsion copolymer 15) with a solids content of 432%, a viscosity at 23° C. of 70 mPas and a pH of 7.8 is obtained. The hydroxyl group content of the solid is 2 wt. %.

Comparison Example 16
(Polymer 16)
Example 1 from EP 841 352 was reworked. A fine-particled aqueous polyacrylate secondary dispersion with a solids content of 37%, a viscosity of 1,400 mPas and a pH of 7.5 is obtained. The content of hydroxy-functional monomers is 32.6 wt. %, and the content of carboxy-functional monomers, which are present in the neutralized form to the extent of approx. 50% is 5.3 wt. %. The hydroxyl group content is 4.0 wt. %.

Comparison Example 17
(Polymer 17)
Polyester-polyacrylate secondary dispersion prepared according to EP 543 228 (Bayhydrol® VP LS 2290, Bayer AG) with a solids content of 44%, a viscosity of 1,500 mPas and a pH of 8.0. The hydroxyl group content is 4.0 wt. %.

Comparison Example 18
(Polymer 18)
A polymer secondary dispersion according to example 1 from EP-A 170 184 was reworked. A fine-particled aqueous secondary dispersion with a solids content of 31% and a viscosity of 1,200 mPas is obtained.

Use example A)
A filler composition was prepared in a laboratory dissolver from 100 g emulsion copolymer 7), 10 g of a water/butyl glycol=1:1 mixture, 10 g Finntalk® M 40 (talc for good sandability, Finnminerals, Finland), 75 g Westmin® D 100 (talc for high degree of filling, Westmin Minerals, Australia), 1.3 g Foamaster® TCX (defoamer, Henkel, Germany), 50 g Mikhart® 10 (calcium carbonate, admixed extender, Provenciale, France) 10 g zinc phosphate ZP10 (anticorrosion pigment, Heubach, Germany) and additionally 25 g Finntalk® as an additional variable amount added to adjust the filler consistency.

100 g of this first component are mixed homogeneously with 6 g polyisocyanate 1) in a laboratory stirrer.

The aqueous reactive filler composition 19) according to the invention thus prepared is drawn on to non-sanded vehicle body sheets at room temperature in a layer thickness of approx. 1 mm.

The following test results were determined:

Filler consistency[1]: good

Deformability[2]: good

Sandability[3]: after 30 minutes 2a after 45 minutes 0a

Adhesion[4]: very good (after 45 minutes)

Pendulum hardness[5]: after 4 hours of drying at room temperature:26" after 24 hours of drying at room temperature: 114" after 2 hours of drying at 80° C.: 143"

Drying time[6]: 70 minutes

Pot life[7]: >8 hours

Processing time[8]: 12 minutes

The aqueous reactive filler composition according to the invention shows outstanding properties throughout. It combines good processability with rapid drying and a very rapid, good sandability, a very rapid adhesion is achieved, and the hardness and pot life also meet high requirements.

[1] The filler consistency is evaluated in accordance with the following qualitative grading: Good>satisfactory>thick or thin>too thick or too thin.

[2] The deformability is evaluated in accordance with the following qualitative grading: Readily deformable>still readily deformable>poorly deformable>not deformable.

[3] The sandability is evaluated as follows:

The sandability itself is evaluated from very good=0 to very poor 5, with the intermediate gradings good=1, still good=2, moderate=3, poor=4.

The time before the desired sandability is achieved is also very important, the shorter the time required the better. The achievement of a good sandability within one hour during curing at room temperature is to be evaluated overall as very good here. Filler compositions which require longer than three hours to achieve a good sandability are to be evaluated overall as unsuitable.

The blocking of the sanding paper during sanding is furthermore also evaluated, and here a=does not block (best evaluation), b=blocks somewhat and c=blocks severely (poorest evaluation).

[4] The adhesion is evaluated with the aid of the time taken to achieve a good adhesion.

Adhesion within 2 hours: Very good

Adhesion within 6 hours: Good

Adhesion within 24 hours: still acceptable

Time taken to achieve a good adhesion more than 24 hours, or no adhesion at all: Poor

[5] The Pendulum hardness (DIN 53157) is determined on films (250 nm wet) of the binder combination of component a) and component b) after addition of 10 wt. % butyl glycol and defoamer, in order to obtain values which can be compared without the influence of component c). Pendulum hardnesses of >100" after 24 hours of drying at room temperature are to be described as very good.

[6] The drying time is measured on the films corresponding to the pendulum hardness determination, but with a wet film thickness of 500 mm. The time until no impresssions are detectable in a test with the finger (finger drying) is stated. The faster the drying, the better the suitability for filler compositions.

[7] The pot life is defined as the period of time before a reactive aqueous 2-component binder combination of polymer a) and polyisocyanate b) shows detectable changes, such as e.g. a clear increase in viscosity, formation of lumps, precipitates or crosslinking.

[8] The processing time stated is the period of time within which the aqueous reactive filler composition can be processed reliably and leads to reproducible results. The actual processing time is often longer, but this time can be subject to variations, and first changes in the filler composition, such as e.g. skin formation, or changes in the application properties, such as e.g. a less good deformability, or changes in the end properties of the filler compositions applied, such as a somewhat longer time before a good adhesion is achieved, may already occur. In spite of these changes beginning, it is often still possible to obtain cured filler compositions with good end properties after application and curing.

Use example B)

The same amount of the first component (identical preparation with emulsion copolymer 7), with the only difference that the variable amount added of Finntalk® M 40 was reduced from 30 g to 20 g during the preparation) from use example A) is mixed homogeneously with 1.5 g polyisocyanate 2) in a laboratory stirrer and the mixture is applied as a filler as described above.

The following test results were determined:

Filler consistency: good

Deformability: good

Sandability: after 30 minutes 0–1a after 45 minutes 0–1a after 60 minutes 0a

Adhesion: very good (after 45 minutes)

Storage stability test: Evaluation of the filler consistency of the first component with storage at room temperature after 10 days: OK after 20 days: OK after 30 days: OK after 60 days: OK after 90 days: OK The aqueous reactive filler composition according to the invention also shows a good processability, very rapid sandability and adhesion.

Use example C)

The first component of the filler composition is prepared in accordance with use example A), with the difference thatemulsion copolymer 8) is employed as the copolymer and the variable amount added of Finntalk® M 40 was reduced to 15 g during the preparation). 100 g of this first component thus obtained is mixed homogeneously with 4.2 g polyisocyanate 1) in a laboratory stirrer and the mixture is applied as a filler as described above.

The following test results were determined:

Filler consistency: good

Deformability: good

Sandability: after 30 minutes 0–1a after 45 minutes 0–1a after 60 minutes 0a

Adhesion: very good (after 45 minutes)

Storage stability test: Evaluation of the filler consistency of the first component with storage at room temperature after 10 days: OK after 20 days: OK after 30 days: OK after 60 days: OK after 90 days: OK The aqueous reactive filler composition according to the invention also shows a good processability, very rapid sandability and adhesion.

Use example D)

The first component of the filler composition is prepared in accordance with use example A), with the difference thatemulsion copolymer 9) is employed as the copolymer and 45 g are added as the variable amount added of Finntalk® M 40. 100 g of this first component thus obtained are mixed homogeneously with 3.87 g polyisocyanate 1) and the mixture is applied as a filler as described above.

The following test results were determined:

Filler consistency: good

Deformability: still readily deformable

Sandability: after 30 minutes 0–1a after 45 minutes 0a

Adhesion: good

Pendulum hardness: after 4 hours of drying at room temperature: 51"

after 24 hours of drying at room temperature: 96"

after 2 hours of drying at 80° C: 110"

Drying time: 60 minutes

Pot life: >4 hours

Processing time: 5 minutes

This filler composition according to the invention is convincing above all due to a rapid drying and surface-drying, rapid hardness development and good sandability.

Use example E)

The first component of the filler composition is prepared in accordance with use example A), with the difference thatemulsion copolymer 10) is employed as the copolymer and 20 g are added as the variable amount added of Finntalk® M 40. 100 g of this first component thus obtained are mixed homogeneously with 4.27 g polyisocyanate 1) and the mixture is applied as a filler as described above.

The following test results were determined:

Filler consistency: good

Deformability: readily deformable

Sandability: after 30 minutes 5 after 45 minutes 0a

Adhesion: good

Pendulum hardness: after 4 hours of drying at room temperature: 13"
after 24 hours of drying at room temperature: 47"
after 2 hours of drying at 80° C.: 116"

Drying time: 70 minutes

Pot life: >4 hours

Processing time: 12 minutes

This filler composition according to the invention is convincing above all due to specific drying properties. It is readily processable and can be deformed for a relatively long period of time after drawing (approx. 30 minutes), and it dries thoroughly exceptionally rapidly after this delayed surface-drying.

Use example F)

The first component of the filler composition is prepared in accordance with use example A), with the difference that emulsion copolymer 11) is employed as the copolymer. 100 g of this first component thus obtained are mixed homogeneously with 4.27 g polyisocyanate 1) and the mixture is applied as a filler as described above.

The following test results were determined:

Filler consistency: good

Deformability: readily deformable

Sandability: after 30 minutes 5
after 45 minutes 3a
after 60 minutes 1a
after 75 minutes 0a Drying time: 80 minutes Pot life: >8 hours Processing time: 10 minutes This filler composition according to the invention is convincing above all due to a good processability and high elasticity.

Comparison Example G)

The first component of the filler composition is prepared in accordance with use example A), with the difference that an equivalent amount of copolymer 16) is employed as the copolymer and 25 g are added as the variable amount added of Finntalk® M 40. 100 g of this first component thus obtained are mixed homogeneously with 8.8 g polyisocyanate 1) and the mixture is applied as a filler as described above.

The following test results were determined:

Filler consistency: thick, after 1 day severely thickened

Deformability: poorly deformable

Sandability: after 60 minutes 5
after 120 minutes 5
after 180 minutes 5
after 240 minutes 5
after 300 minutes 5
after 24 hours 2a–b, soft Drying time: 120 minutes This filler composition dries slowly and is still not sandable to the required degree even after 24 hours of drying. It furthermore shows a very limited stability and a less good processability.

Comparison Example H)

The first component of the filler composition is prepared in accordance with use example A), with the difference that an equivalent amount of copolymer 17) is employed as the copolymer and 25 g are added as the variable amount added of Finntalk® M 40. 100 g of this first component thus obtained are mixed homogeneously with 8.8 g polyisocyanate 1) and the mixture is applied as a filler as described above.

The following test results were determined:

Filler consistency: thin

Deformability: still readily deformable

Sandability: after 60 minutes 5
after 120 minutes 5
after 180 minutes 5
after 240 minutes 5
after 300 minutes 5
after 24 hours 2a–b, soft Drying time: 150 minutes This filler composition dries slowly and is still not sandable to the required degree even after 24 hours of drying. It furthermore shows a processability which is overall less good.

Comparison Example I)

The first component of the filler composition is prepared in accordance with use example A), with the difference that an equivalent amount of polymer 18) is employed as the copolymer and 25 g are added as the variable amount added of Finntalk® M 40. 100 g of this first component thus obtained are mixed homogeneously with 8.8 g polyisocyanate 1) and the mixture is applied as a filler as described above.

The following test results were determined:

Filler consistency: thin

Deformability: still readily deformable

Sandability: after 60 minutes 5
after 120 minutes 5
after 180 minutes 5
after 240 minutes 4c
after 300 minutes 4a
after 24 hours 2, somewhat soft Drying time: 150 minutes This filler composition dries slowly and is still not sandable to the required degree even after 24 hours of drying. It furthermore shows a less good processability.

The same experiment was repeated, but without polyisocyanate 1), and instead with addition of 0.1% of a 10% cobalt siccative solution to accelerate the oxidative drying.

The following test results were determined:

Filler consistency: too thin

Deformability: poorly deformable

Sandability: after 60 minutes 5
after 120 minutes 5
after 180 minutes 5
after 240 minutes 3c
after 300 minutes 1a
after 24 hours 0a, somewhat soft, good adhesion Drying time: 120 minutes This filler composition now dries more rapidly, and the sandability is also achieved somewhat more rapidly, but is still substantially poorer than in the case of products according to the invention. Furthermore, the processability is overall poor. Polymer 18) is not suitable as a sole binder for high-quality filler compositions, but it can be co-used in minor amounts to improve adhesion properties.

Use Example J)

A filler composition is prepared from 100 emulsion copolymer 15) in a laboratory dissolver.

The aqueous, exceptionally reactive filler composition J) according to the invention thus prepared is prepared with 10 g of a water/butyl glycol=1:1 mixture, 100 g Finntalk® M 40, 150 g barite EWG (Sachtleben, Germany), 1.3 g Foamaster® TCX, 50 g Mikhart 10, 10 g titanium dioxide (Bayertitan R-KB-2, Bayer, Germany), 1.5 g Aerosil® 200 (Degussa, Germany) and 20 g zinc phosphate ZCP (anticorrosion pigment, Heubach, Germany).

100 g of this first component are mixed homogeneously with 3.3 g polyisocyanate 1) in a laboratory stirrer and the mixture is drawn on to a non-sanded vehicle body sheet at room temperature in a layer thickness of approx. 1 mm.

The following test results were determined:

Filler consistency: good

Deformability: good

Sandability: after 30 minutes 0a

Pendulum hardness: after 4 hours of drying at room temperature:23"
after 24 hours of drying at room temperature: 94"
after 2 hours of drying at 80° C.: 123"

Drying time: 20 minutes

Processing time: 6 minutes

The aqueous filler composition according to the invention is exceptionally reactive in this formulation, and it shows very rapid drying, very rapid sandability, a high hardness and good processability.

Use Example K)

Use example J) is repeated, but emulsion polymer 7) is employed and 3.3 g polyisocyanate 1) and 2.1 g polyisocyanate 3) are used.

The aqueous, exceptionally reactive filler composition K) according to the invention thus prepared is drawn on to non-sanded vehicle body sheets at room temperature in a layer thickness of approx. 1 mm.

The following test results were determined:

Filler consistency: good

Deformability: good

Sandability: after 20 minutes 0a

Pendulum hardness: after 4 hours of drying at room temperature: 24"
after 24 hours of drying at room temperature: 103"
after 2 hours of drying at 80° C.: 138"

Drying time: 15 minutes

Processing time: 4 minutes

The aqueous filler composition according to the invention is exceptionally reactive in this formulation, and it shows very rapid drying, very rapid sandability, a high hardness and good processability.

Comparison Example L)

A filler composition is prepared in accordance with use example J), but the addition of the polyisocyanate crosslinking agent is omitted.

The aqueous filler composition L) thus prepared is drawn on to non-sanded vehicle body sheets at room temperature in a layer thickness of approx. 1 mm.

The following test results were determined:

Filler consistency: good

Deformability: good

Sandability: Cannot be determined, since the filler composition became detached from the sheet after approx. 50 minutes.

Processing time: 20 minutes

The aqueous filler composition without addition of a polyisocyanate crosslinking agent is unusable.

Use Example M)

Use example J) is repeated, but emulsion polymer 7) is employed and 3.5 g polyisocyanate 4) are used.

The aqueous, exceptionally reactive filler composition according to the invention thus prepared is drawn on to non-sanded vehicle body sheets at room temperature in a layer thickness of approx. 1 mm.

The following test results were determined:

Filler consistency: good

Deformability: good

Sandability: after 30 minutes 1a
after 45 minutes 0a

Pendulum hardness: after 4 hours of drying at room temperature: 26"
after 24 hours of drying at room temperature: 33"
after 2 hours of drying at 80° C.: 48"

Drying time: 20 minutes

Processing time: 4 minutes

The aqueous filler composition according to the invention is exceptionally reactive in this formulation, and it shows very rapid drying, rapid sandability and good processability. In this formulation, it offers the possibility of very readily sandable filler compositions which nevertheless have a relatively low hardness and a very good elasticity, which may be advantageous e.g. for filling plastics.

Use Example N)

The first component of the filler composition is prepared in accordance with use example A), with the difference thatemulsion copolymer 12) is employed as the copolymer. 100 g of this first component thus obtained are mixed homogeneously with 4.3 g polyisocyanate 6) and the mixture is applied as a filler as described above.

The following test results were determined:

Filler consistency: good

Deformability: readily deformable

Sandability: after 30 minutes 4a
after 45 minutes 2a
after 60 minutes 0a

Adhension: very good

Pendulum hardness: after 4 hours of drying at room temperature: 15"
after 24 hours of drying at room temperature: 49"
after 2 hours of drying at 80° C.: 115"

Drying time: 60 minutes

Pot life: >8 hours

Processing time: 8 minutes

This filler composition according to the invention is convincing due to a good processability and high hardness.

By using polyisocyanate 6), the good sandability is not achieved quite so rapidly, but is still very good.

Comparison Example O)

The first component of a filler composition is prepared in accordance with use example A), with the difference that the copolymer from comparison example 13) is employed as the copolymer.

It is not possible to obtain a stable first component of a filler composition in this manner, since very severe thickening takes place immediately on mixing and during preparation of the first components. Mixing with a polyisocyanate component or application as a filler composition is no longer possible.

Use Example P)

The first component of the filler composition is prepared in accordance with use example A), with the difference that emulsion copolymer 14) is employed as the copolymer and 40 g are added as the variable amount added of Finntalk®M 40. 100 g of this first component thus obtained are mixed homogeneously with 3.93 g polyisocyanate 1) and the mixture is applied as a filler as described above.

The following test results were determined:
Filler consistency: good
Deformability: readily deformable
Sandability: after 30 minutes 3a
  after 45 minutes 2a
  after 60 minutes 0–1a
  after 75 minutes 0a
Adhesion: very good (after 60 minutes)
Pendulum hardness: after 4 hours of drying at room temperature: 27"
  after 24 hours of drying at room temperature: 47"
  after 2 hours of drying at 80° C.: 79"
Drying time: 60 minutes
Processing time: 4 minutes
Pot life: >6 hours The filler composition according to the invention is convincing due to a very good processability and adhesion and good sandability.

Use Example Q)

The first component of the filler composition is prepared in accordance with use example A) using emulsion copolymer 7). 100 g of this first component thus obtained are mixed homogeneously with a mixture of 43.1 g polyisocyanate 1) and 2.1 g polyisocyanate 5) in a laboratory stirrer and the mixture is applied as a filler as described above.

The following test results were determined:
Filler consistency: good
Deformability: good
Sandability: after 30 minutes 3a
  after 45 minutes 2a
  after 60 minutes 0a
Adhesion: good
Pendulum hardness: after 4 hours of drying at room temperature: 36"
  after 24 hours of drying at room temperature: 128"
  after 2 hours of drying at 80° C.: 155"
Drying time: 45 minutes
Processing time: 8 minutes The aqueous reactive filler composition according to the invention shows a good processability, rapid sandability, good adhesion and a very rapid hardness development as well as an exceptionally high final hardness.

What is claimed is:

1. An aqueous, reactive binder composition for aqueous, reactive, filler compositions comprising
   a) at least one emulsion copolymer which contains isocyanate-reactive groups and which is present in an aqueous dispersion or an emulsion, said copolymer being produced by polymerizing a monomer mixture of a1), a2), a3) and a4):
   a1) from 50 to 85 wt. % of one or more hardening monomers, said hardening monomers producing homopolymers having glass transition temperature above 0° C.,
   a2) from 5 to 30 wt. % of one or more plasticizing monomers, said plasticizing monomers producing homopolymers having glass transition temperatures below 0° C.,
   a3) from 2 to 30 wt. % of one or more hydroxy-functional monomers, and
   a4) from 1 to 4 wt. % of one or more carboxyl- and/or carboxylate-functional monomers,
   wherein the sum of monomers a1) through a4) is 100 wt. % and
   b) at least one polyisocyanate which contains free isocyanate groups and has a viscosity of from 10 to 10,000 mPas/23° C. and a functionality of from 2.4 to 5.5.

2. The reactive binder composition of claim 1, wherein said hardening monomers a1) are selected from the group consisting of methyl methacrylate, ethyl methacrylate, n-propyl methacrylate, iso-propyl methacrylate, n-butyl methacrylate, iso-butyl methacrylate, tert-butyl methacrylate, n-pentyl methacrylate, iso-pentyl methacrylate, n-hexyl methacrylate, cyclohexyl methacrylate, norbornyl methacrylate, isobornyl methacrylate, phenyl methacrylate, styrene, α-methylstyrene, vinyl toluene, acrylonitrile, methacrylonitrile, dimethyl maleate, diethyl maleate and mixtures thereof, and
wherein said plasticizing monomers a2) are selected from the group consisting of methyl acrylate, ethyl acrylate, n-propyl acrylate, iso-propyl acrylate, n-butyl acrylate, iso-butyl acrylate, tert-butyl acrylate, n-pentyl acrylate, iso-pentyl acrylate, n-hexyl acrylate, cyclohexyl acrylate, n-heptyl acrylate, nonyl acrylate, n-otyl acrylate, 2-ethylhexyl acrylate, decyl acrylate, iso-decyl acrylate, dodecyl acrylate, lauryl acrylate, stearyl acrylate, norbornyl acrylate, methoxypolypropylene glycol acrylate, methoxypolyethylene glycol acrylate, isobornyl acrylate, oleyl acrylate, palmityl acrylate, n-heptyl methacrylate, nonyl methacrylate, n-octyl methacrylate, 2-ethylhexyl methacrylate, decyl methacrylate, Iso-decyl methacrylate, dodecyl methacrylate, lauryl methacrylate, stearyl methacrylate, methoxypolyethylene glycol methacrylate, methoxypolypropylene glycol methacrylate, oleyl methacrylate, palmityl methacrylate, di-n-butyl maleate and mixtures thereof.

3. The aqueous, reactive binder composition of claim 1, wherein the monomer mixture of a1), a2), a3) and a4) contains at least 40 wt. % based on the total solids content of said copolymer, of styrene as at least part of monomer a1).

4. The aqueous, reactive binder composition of claim 1, wherein
   a1) said hardening monomer is selected from the group consisting of styrene, methyl methacrylate, n-butyl methacrylate, iso-butyl methacrylate, tert-butyl methacrylate and mixtures thereof,
   a2) said plasticizing monomer is selected from the group consisting of n-butyl acrylate, ethyl acrylate, 2-ethylhexyl acrylate and mixtures thereof,
   a3) said hydroxy-functional monomer is selected from the group consisting of hydroxypropyl methacrylate, hydroxyethyl methacrylate, hydroxypropyl acrylate, hydroxyethyl acrylate, and mixtures thereof,
   a4) said carboxyl and/or carboxylate-functional monomer is selected from the group consisting of acrylic acid, methacrylic acid and mixtures thereof and wherein at amounts of up to 1.5 wt. % of a4), at least 50% are present in neutralized from, and wherein said composition contains from 1.0 to 2.0 wt. %, based on the total amount of monomers, of emulsifier or emulsifier mixtures and from 0.15 to 0.45 wt. %, based on the total amount of monomers, of initiator or initiator mixtures, and wherein said copolymer has i) a solids content Is from 30 to 56 wt. %, ii) a viscosity of from 10 to 5,000 mPas/23° C., iii) an acid number of from 5 to 30 mg KOH/g, based on a solids content of 100 wt. %, and iv) an hydroxyl group content of from 0.2 to 3.5 wt. %, based on a solids content of 100 wt. %, and the aqueous dispersion or emulsion has a pH of from 5.5 to 9.

5. The aqueous, reactive binder composition of claim 1, wherein polyisocyanate b) is selected from the group consisting of i) low-viscosity hydrophobic polyisocyanates based on hexamethylene-diisocyanate and containing isocyanurate, uretdione, allophanate and/or urethane groups, ii) polyisocyanates based on hexamethylene-diisocyanate and hydrophilically modified by reaction with a hydrophilic polyether and iii) mixtures thereof.

6. The aqueous reactive binder composition of claim 1, wherein polyisocyanate b) comprises an allophanate-hydrophilic polyisocyanate prepared by the reaction of a hydrophilic polyether with an aliphatic and/or cycloaliphatic polyisocyanate employing suitable catalysts.

7. The aqueous, reactive binder composition of claim 1, wherein polyisocyanate b) comprises a hexamethylene-diisocyanate polyisocyanate with iminooxadiazinedione groups.

8. The aqueous, reactive binder composition of claim 1, wherein polyisocyanate b) comprises nonane-triisocyanate.

9. The aqueous, reactive binder composition of claim 1, wherein said copolymer a) has a core/shell structure, the core content is 20 to 80 wt. % and the core and shell comprise different amounts of the isocyanate-reactive groups and/or the plasticizing monomer.

10. The aqueous, reactive binder composition of claim 1, wherein components a) and b) are light-fast.

11. Wood, a woody substrate or cork coated with the aqueous reactive binder composition of claim 1.

12. A metallic substrate, vehicle body or plastic coated with the aqueous, reactive binder composition of claim 1.

13. A marble, granite and mineral substrate coated with the aqueous, reactive binder composition of claim 1.

14. A glass fibre-reinforced plastic, glass fibre-reinforced sheet-like structure or casting resin coated with the aqueous, reactive binder composition of claim 1.

15. An aqueous, reactive, filler composition comprising:
   a) 10 to 50 wt. % of at least one emulsion copolymer which contains isocyanate-reactive groups and has a weight average molecular weight of >50,000 g/mol, said copolymer being produced by polymerizing:
      a1) from 50 to 85 wt. % of one or more hardening monomers, said hardening monomers producing homopolymers having glass transition temperature above 0° C.,
      a2) from 5 to 30 wt. % of one or more plasticizing monomers, said plasticizing monomers producing homopolymers having glass transition temperatures below 0° C.,
      a3) from 2 to 30 wt. % of one or more hydroxy-functional monomers, and
      a4) from 1 to 4 wt. % of one or more carboxyl- and/or carboxylate-functional monomers,
      wherein the sum of monomers a1) through a4) is 100 wt. % and
   b) from 1 to 9.8 wt. % of at least one polyisocyanate which contains free isocyanate groups and has a viscosity of from 10 to 20,000 mPas/23° C. and a functionality of 2 to 6,
   c) from 40 to 90 wt. % of at least one pigment and/or filler,
   d) from 0 to 3 wt. % of an auxiliary substance or additive,
   e) from 0 to 50 wt. % of further oligomer or polymer other than a), optionally present in the form of an aqueous solution, dispersion or emulsion, and
   f) from 0 to 20 wt. % of water and/or an organic solvent,
   wherein the sum of a) to f) is 100 wt. % and the weight ratio of resin (solids from component a), component b) and component e)) to pigment/filler (solids from component c)) is from 1:1.5 to 1:15.

16. The aqueous, reactive, filler composition of claim 15, comprising
   a) from 22 to 38 wt. % of component a),
   b) from 1 to 7.5 wt. % of component b), and wherein component b) has a viscosity of from 10 to 10,000 mPas/23° C. and a functionality of from 2.4 to 5.5,
   c) from 53 to 75 wt. % of component c),
   d) from 0 to 2 wt. % of component d),
   e) from 0 to 20 wt. % of component e), and
   f) from 0 to 10 wt. % of component f), and
   wherein the weight ratio of resin (solid from component a), component b) and component e)) to pigment/filler (solids from component c)) is from 1:2.1 to 1:10.

17. The aqueous, reactive, filler composition of claim 15, wherein no more than 10 wt. %, based on the total amount of c) is an inorganic coloring pigment.

18. The aqueous, reactive, filler composition of claim 15, wherein component e) comprises epoxy- and/or carbodiimide-functional oligomer or polymer.

19. The aqueous, reactive, filler composition of claim 15, which contains less than 5 wt. % of volatile organic substances.

20. A process for the preparation of the aqueous, reactive, filler composition of claim 15 comprising i) mixing components a), c), d), e) and f) and ii) homogeneously mixing component b).

21. A process for the preparation of the aqueous, reactive, filler composition of claim 15 comprising i) mixing components a), c), d), e), and up to 10 wt. %, based on the total solids content, of component f) and polyisocyanate b), and ii) adjusting to the required processing consistency by adding the remainder of component f).

* * * * *

UNITED STATES PATENT AND TRADEMARK OFFICE
CERTIFICATE OF CORRECTION

PATENT NO. : 6,706,801 B1
DATED : March 16, 2004
INVENTOR(S) : Harald Blum et al.

It is certified that error appears in the above-identified patent and that said Letters Patent is hereby corrected as shown below:

Column 31,
Line 9, delete "Is".
Line 10, delete "56" and insert -- 55 --.

Signed and Sealed this

Tenth Day of August, 2004

JON W. DUDAS
*Acting Director of the United States Patent and Trademark Office*